(12) United States Patent
Ortet et al.

(10) Patent No.: US 12,176,804 B2
(45) Date of Patent: Dec. 24, 2024

(54) CONVERTER AND METHOD FOR STARTING A SWITCHING POWER SUPPLY

(71) Applicant: STMicroelectronics (Rousset) SAS, Rousset (FR)

(72) Inventors: Sebastien Ortet, Chateauneuf-le-Rouge (FR); Vincent Binet, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 91 days.

(21) Appl. No.: 17/647,133

(22) Filed: Jan. 5, 2022

(65) Prior Publication Data

US 2022/0263406 A1    Aug. 18, 2022

(30) Foreign Application Priority Data

Feb. 15, 2021    (FR) ..................................... 2101421

(51) Int. Cl.
*H02M 1/36* (2007.01)
*H02M 1/00* (2007.01)
*H02M 3/158* (2006.01)

(52) U.S. Cl.
CPC ........... *H02M 1/36* (2013.01); *H02M 1/0025* (2021.05); *H02M 3/158* (2013.01)

(58) Field of Classification Search
CPC .. H02M 1/0025; H02M 3/158; H02M 3/1588; H02M 1/36
See application file for complete search history.

(56) References Cited

U.S. PATENT DOCUMENTS

| | | | |
|---|---|---|---|
| 8,080,987 B1 | 12/2011 | Qiu et al. | |
| 2004/0070382 A1* | 4/2004 | Walters | H02M 3/1584 323/284 |
| 2012/0217946 A1 | 8/2012 | Ju | |
| 2014/0084886 A1* | 3/2014 | Causse | H02M 3/158 323/282 |
| 2015/0263602 A1* | 9/2015 | Drda | H02M 1/08 363/21.02 |
| 2016/0013713 A1* | 1/2016 | Li | H02M 3/1584 323/312 |
| 2016/0181927 A1* | 6/2016 | Chang | H02M 1/42 363/21.02 |
| 2016/0241144 A1* | 8/2016 | Onodera | H02M 1/36 |
| 2017/0070149 A1* | 3/2017 | Guan | H02M 1/36 |
| 2017/0264195 A1 | 9/2017 | Li | |
| 2017/0310214 A1* | 10/2017 | Kawano | H02M 3/156 |
| 2018/0337599 A1* | 11/2018 | Chen | H02M 3/158 |
| 2021/0091665 A1* | 3/2021 | Sorace | H02M 3/1582 |
| 2022/0200450 A1* | 6/2022 | Sun | H02M 3/157 |

FOREIGN PATENT DOCUMENTS

| | | |
|---|---|---|
| CN | 202713140 U | 1/2013 |
| KR | 101232605 B1 | 2/2013 |

* cited by examiner

*Primary Examiner* — Gustavo A Rosario-Benitez
(74) *Attorney, Agent, or Firm* — Slater Matsil, LLP

(57) ABSTRACT

The present disclosure relates to a voltage converter and method for pulse frequency modulation-type operation during a start-up phase.

23 Claims, 2 Drawing Sheets

CONVERTER AND METHOD FOR STARTING A SWITCHING POWER SUPPLY

CROSS-REFERENCE TO RELATED APPLICATIONS

This application claims the benefit of French Patent Application No. 2101421, filed on Feb. 15, 2021, which application is hereby incorporated herein by reference.

TECHNICAL FIELD

The present description relates generally to electronic circuits and methods, and more particularly to switched mode power supplies (SMPS) and their operation, in particular during power supply start-up.

BACKGROUND

In a switched mode power supply, also called a switched mode converter, a supply potential, supplied to an input of the switched mode power supply, is chopped by switching MOS (Metal Oxide Semiconductor) transistors in such a way as to implement phases of energy accumulation in an inductive element or inductance and phases of restitution, to a load connected to the output of the switched mode power supply, of the energy accumulated in this inductive element.

SUMMARY

One embodiment provides a voltage converter configured to operate in a pulse frequency modulation type of operation during a start-up phase.

Another embodiment provides a method for controlling a voltage converter wherein the converter operates in a pulse frequency modulation type operating mode during a start-up phase.

According to one embodiment, the converter comprises first and second transistors connected in series between a first node for applying a first supply voltage and a second node for applying a second reference voltage, the first and second transistors being connected to each other by a third node, the third node being connected to a fourth output node by an inductor, the fourth output node being connected to the second node for applying the second reference voltage by a first capacitor.

According to one embodiment, the converter comprises a first circuit configured to generate the control signals for the first and second transistors such that a third output voltage on the fourth node follows a fourth reference voltage.

According to an embodiment, the converter comprises a second circuit configured to generate the fourth setpoint voltage, such that the value of the fourth setpoint voltage increases to the value of a fifth setpoint voltage during the start-up phase of the converter.

According to one embodiment, the second circuit is configured to provide a first signal indicating that the converter is capable of supplying a load when the fourth voltage reaches the value of the fifth voltage.

According to one embodiment, the second circuit comprises a first comparator supplying on output the first signal, and an input of which is connected to a fifth node for applying the fifth voltage and a sixth node for applying the fourth voltage, the sixth node being connected to the first node by a current source and to the second node by a second capacitor.

According to one embodiment, the first circuit comprises a second comparator configured to compare the third voltage with the fourth voltage and provide a second signal controlling the start of a cycle comprising an energy accumulation phase and an energy restitution phase.

According to one embodiment, the first circuit comprises: a third comparator configured to compare the fourth voltage to a first voltage ramp, and to output a third signal determining the duration of the energy storage phase; and a fourth comparator configured to compare the fourth voltage to a second voltage ramp, and to output a fourth signal determining the duration of the energy release phase.

According to one embodiment, the converter is configured to put the third node in a high impedance state between cycles.

According to one embodiment, the fifth voltage is substantially constant during the growth of the fourth voltage during the start-up phase.

According to an embodiment, the converter is configured such that the current in the inductor is always positive during the operation of the converter.

BRIEF DESCRIPTION OF THE DRAWINGS

The foregoing features and advantages, as well as others, will be described in detail in the following description of specific embodiments given by way of illustration and without limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose of identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
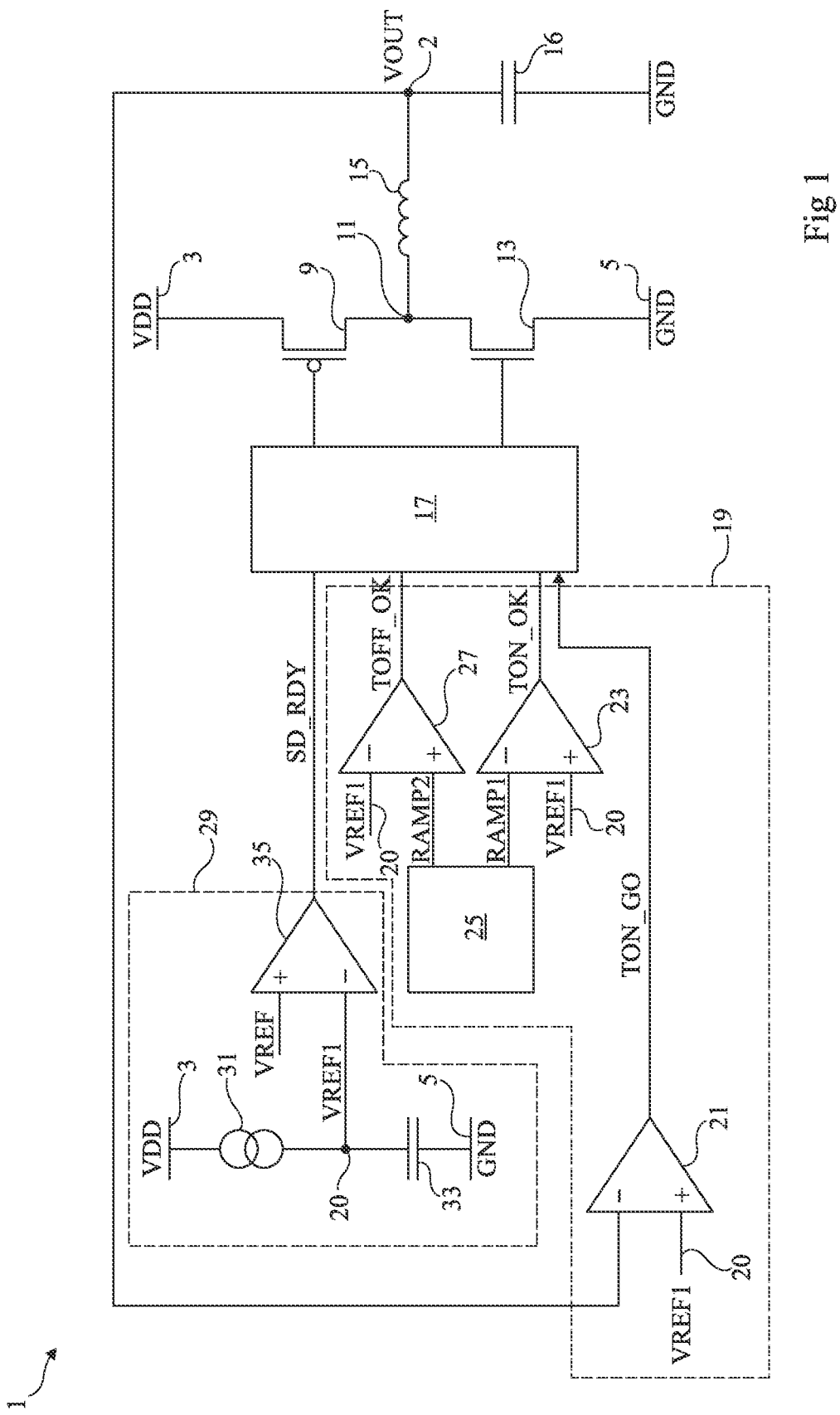
FIG. 1 shows an embodiment of a voltage converter.

FIG. 1 shows one embodiment of a voltage converter 1. The converter 1 is a DC/DC converter, of the switching power supply type, which converts a DC supply voltage to a DC output voltage.

The converter 1 is configured to provide a DC output voltage VOUT. The converter comprises an output node 2, at which the voltage VOUT is available.

The converter 1 is supplied with a DC supply voltage VDD. The converter 1 is then connected between a first conductor rail, or node, 3 connected to the voltage VDD, and a second conductor rail, or node, 5 connected to a reference potential GND, for example ground.

The converter 1 is configured to provide the voltage VOUT at a value equal to a setpoint value. For this purpose, the converter 1 receives a DC setpoint voltage VREF referenced to the potential GND, the value of which is shown to be equal to the setpoint value of the voltage VOUT, preferably equal to the setpoint value of the voltage VOUT.

In this example, the voltages VOUT, VDD and VREF are positive. In this example, the voltages VOUT, VDD, and VREF are referenced to the potential GND, such as ground.

In this example, the converter 1 is of the step-down or buck type, i.e., the setpoint value of the voltage VOUT is lower than the value of the voltage VDD. In other words, the value of the voltage VOUT is lower than the value of the voltage VDD.

The converter 1 comprises a first MOS (metal oxide semiconductor) transistor 9, preferably a PMOS (P-channel MOS transistor). The MOS transistor 9 is coupled, preferably connected, between the rail 3 and an internal node 11. In other words, a first conduction terminal of the transistor 9, for example its source, is coupled, preferably connected, to the rail 3, with a second conduction terminal of the transistor 9, for example its drain, being coupled, preferably connected, to the node 11.

The converter 1 further comprises a second MOS transistor 13, preferably an NMOS transistor (N-channel MOS transistor). The transistor 13 is coupled, preferably connected, between the node 11 and the rail 5. In other words, a first conduction terminal of the transistor 13, for example its source, is coupled, preferably connected, to the rail 5, with a second conduction terminal of the transistor 13, for example its drain, coupled, preferably connected, to the node 11. Alternatively, the NMOS transistor 13 may be replaced by a diode or a Schottky diode.

Thus, transistors 9 and 13 are connected in series between rails 3 and 5 and are connected to each other at internal node 11. The transistors 9 and 13 form a power stage.

The converter 1 comprises an inductive element or inductor 15. The inductor 15 is connected between node 11 and node 2. The converter 1 comprises an output capacitance or capacitor element 16 connected between the node 2 and the rail 5. As an example, the capacitance of the capacitive element 16 is greater than 2 µF, preferably between 2.2 µF and 20 µF, or even greater than 20 µF. This output capacitor acts as a filter. In other words, this output capacitor of the converter is used to smooth the current present at the node 2.

In operation, a load is, for example, connected between the node 2 and the rail 5 so as to be supplied by the voltage VOUT. This load includes, for example, an input capacitor between the node 2 and the rail 5.

The converter 1 comprises a control circuit 17. The circuit 17 is configured to control the transistors 9 and 13, so as to regulate the voltage VOUT so that its value is equal to the setpoint value VREF.

The converter 1 can operate in a low power mode, i.e., in this embodiment, in a PFM (Pulse Frequency Modulation) type operation, which is an asynchronous operating mode.

In a switching converter in a PFM operating mode, each operating cycle of the converter comprises a phase of energy accumulation in the assembly followed by a phase of energy restitution to the load connected to the converter, the two phases preferably having substantially constant durations from one cycle to the next. During the energy accumulation phase, the current passing through the inductive element increases. During the energy restitution phase, the current passing through the inductive element decreases. For each operating cycle, it is desirable that the current passing through the inductive element is zero at the beginning of the energy accumulation phase and at the end of the energy restitution phase. An energy restitution phase can be separated from the beginning of the next energy accumulation phase by a waiting phase during which the node 11 is in a high impedance state. The frequency of the energy accumulation and restitution phases varies according to the value of the output load.

According to the embodiment of FIG. 1, the converter 1 comprises a circuit 19 configured to operate the converter in the PFM operating mode. The circuit 19 comprises a comparator 21, for comparing the output voltage VOUT to a setpoint voltage VREF1. Thus, the comparator 21 comprises a first input, preferably an inverting input, receiving the voltage VOUT. This first input is coupled, preferably connected, to the node 2. The comparator 21 comprises a second input, preferably a non-inverting input, coupled, preferably connected, to a node 20 applying the voltage VREF1. The comparator 21 provides on an output a signal TON_GO. The signal TON_GO represents the result of the comparison between the voltages VOUT and VREF1. The signal TON_GO is supplied to the circuit 17. Thus, the output of comparator 21 is coupled, preferably connected, to circuit 17.

The circuit 19 comprises another comparator 23 configured to determine the duration of the energy accumulation phase. To do so, the comparator 23 is configured to compare the voltage VREF1 to a voltage ramp RAMP1. The voltage ramp RAMP1 is generated by a voltage ramp generation circuit 25. Thus, an input of the comparator 23, preferably an inverting input, is coupled, preferably connected, to an output of the circuit 25 at which the voltage ramp RAMP1 is provided. Another input of the comparator 23, preferably a non-inverting input, is coupled, preferably connected, to the application node 20 of the voltage VREF1. The comparator 23 provides on an output a signal TON_OK. The signal TON_OK represents the result of the comparison between the voltages RAMP1 and VREF1. The signal TON_OK is supplied to the circuit 17. Thus, the output of comparator 23 is coupled, preferably connected, to circuit 17.

Similarly, circuit 19 comprises another comparator 27 configured to determine the duration of the energy restitution phase. To do so, the comparator 27 is configured to compare the voltage VREF1 to a voltage ramp RAMP2. The voltage ramp RAMP2 is, for example, generated by the voltage ramp generation circuit 25. Thus, one input of the comparator 27, preferably a non-inverting input, is coupled, preferably connected, to an output of the circuit 25 on which the voltage ramp RAMP2 is provided. Another input of the comparator 27, preferably an inverting input, is coupled, preferably connected, to the application node 20 of the voltage VREF1. The comparator 27 provides a signal TOFF_OK to an output. The signal TOFF_OK represents the result of the comparison between the voltages RAMP2 and VREF1. The signal TOFF_OK is supplied to circuit 17. Thus, the output of the comparator 27 is coupled, preferably connected, to circuit 17.

For example, the voltage ramp RAMP1 is an increasing ramp and the voltage ramp RAMP2 is a decreasing ramp. Preferably, the ramps RAMP1 and RAMP2 have constant and substantially equal slopes to each other, to the nearest sign. Preferably, the voltage ramps RAMP1 and RAMP2 are referenced to rail 5.

Operation of the converter in the PFM operating mode is described herein. If the voltage VOUT is greater than the value of the voltage VREF1, the signal TON_GO has a first value and the circuit 17 controls the transistors 9 and 13 such that the transistors 9 and 13 are turned off. The node 11 is thus in a high impedance state. No current flows through inductor 15.

When the voltage VOUT is less than the value of the voltage VREF1, the signal TON_GO takes on a second value indicating to the circuit 17 the beginning of a cycle. Specifically, the second value of the TON_GO signal indicates the beginning of an energy accumulation phase. The circuit 17 then controls the transistor 13 to off and transistor 9 to on. Moreover, the ramp RAMP1 starts to increase from a value LR1, lower than the value of the voltage VREF1 and constant from one cycle to the next. When the value of the ramp RAMP1 reaches the value of the voltage VREF1, the signal TON_OK signals this information, corresponding to the end of the energy accumulation phase, to circuit 17. Thus, the duration of the growth of the voltage RAMP1 from the value LR1 to the value VREF1 corresponds to the duration of the energy accumulation phase.

In addition, when the ramp RAMP1 reaches the value VREF1, a signal TOFF_GO changes from a first value to a second value signifying the start of the energy restitution phase. Thus, when the signal TOFF_GO takes the second value, the circuit 17 controls the transistors 9 and 13 in such a way that the transistor 9 is off and the transistor 13 is on. Moreover, when the signal TOFF_GO takes the second value, the ramp RAMP2 starts to decrease from a value LR2, higher than the value of the voltage VREF1 and constant from one cycle to another. When the value of the ramp RAMP2 reaches the value of the voltage VREF1, the signal TOFF_OK signals this information, corresponding to the end of the energy restitution phase, to circuit 17. Thus, the duration of the decrease of the voltage RAMP2 from the value LR2 to the value VREF1 corresponds to the duration of the energy restitution phase.

At the end of the energy restitution cycle, the node 11 is returned to a high impedance state until the comparator 21 determines that the voltage VOUT is again less than the voltage VREF1.

The converter 1 further comprises a start-up circuit 29. Specifically, the circuit 29 is configured to provide a signal SD_RDY representing information that the converter is ready to power the load connected to the node 2. The circuit 29 is further configured to generate the reference voltage VREF1.

The circuit 29 comprises a current source 31 and a capacitor 33 connected in series between the node 3 and the node 5. More specifically, one terminal of the source 31 is coupled, preferably connected, to the node 3 and another terminal of the source 31 is coupled, preferably connected, to node 20. One terminal of capacitor 33 is coupled, preferably connected, to the node 20 and another terminal of the capacitor is coupled, preferably connected, to the node 5.

The node 20 corresponds to the voltage application node VREF1. Thus, node 20 is coupled, preferably connected, to the inputs of the comparators 21, 23 and 27 receiving the voltage VREF1. For clarity, the connections between the comparators 21, 23 and 27 and the node 20 are not shown.

The voltage VREF1 also corresponds to the voltage across the terminals of the capacitor 33. The value of the voltage VREF1 is therefore selected by charging, using the source 31, the capacitor 33.

The circuit 29 further comprises a comparator 35, configured to compare the voltage VREF1 to the setpoint voltage VREF. Preferably, the value of the voltage VREF is constant. When the value of the voltage VREF1 reaches the value of the voltage VREF, the signal SD_RDY changes from a first value to a second value meaning that the converter is able to supply a load not shown.

The operation of the converter 1 during its start-up will be described in more detail in relation to FIG. 2.

Figure 2:
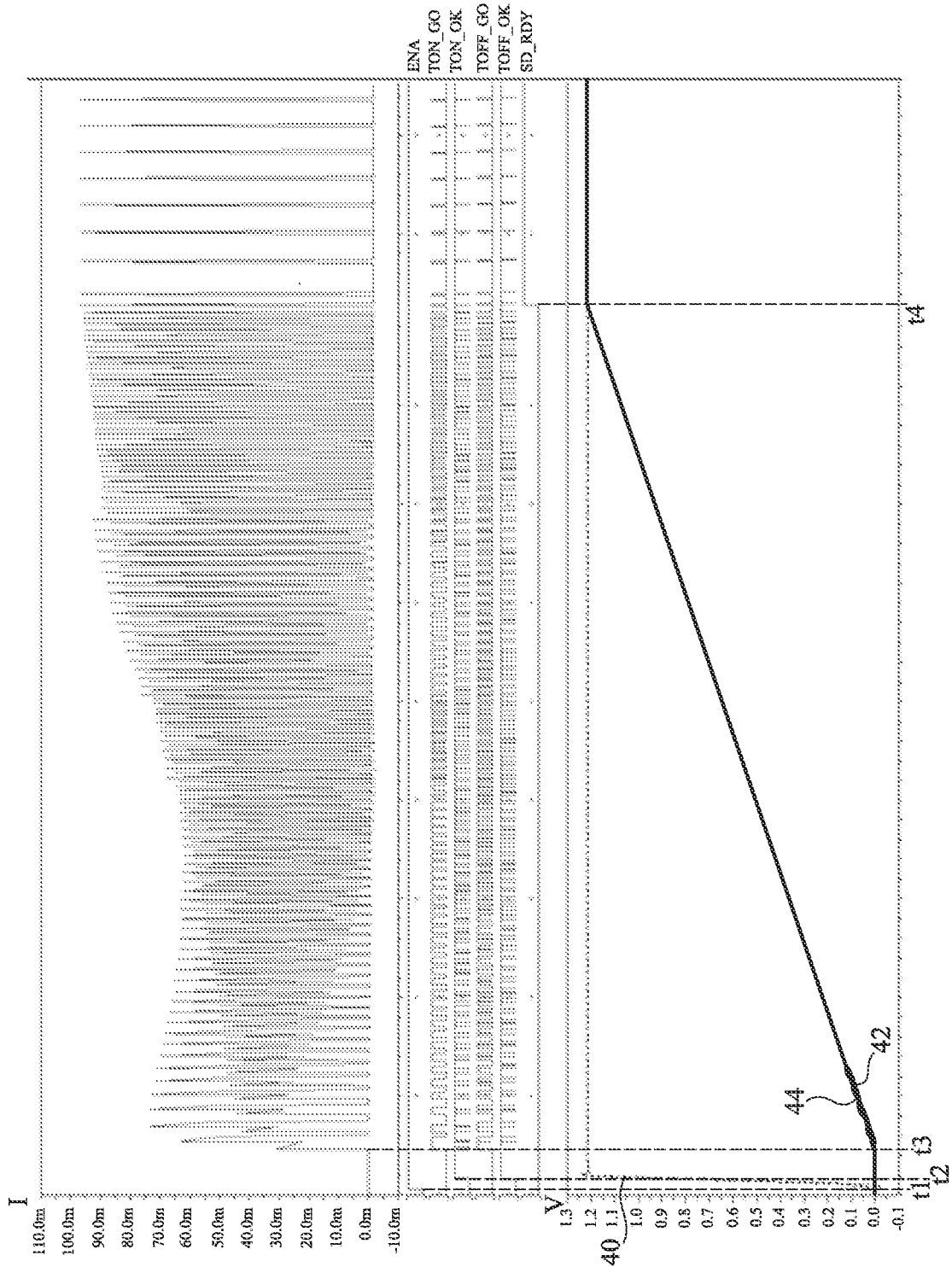
FIG. 2 is a set of timing diagrams illustrating the operation of the converter of FIG. 1.

FIG. 2 is a set of timing diagrams illustrating the operation of the converter 1. Specifically, FIG. 2 comprises a timing diagram representing the current (I) in the inductor 15 as a function of time. FIG. 2 further comprises timing diagrams representing, as a function of time, a signal ENA controlling the start of the converter 1, and the signals TON_GO, TON_OK, TOFF_GO, TOFF_OK and SD_RDY. FIG. 2 further comprises a timing diagram representing voltages (V) as a function of time. FIG. 2 represents the voltage VREF by a curve 40, the voltage VREF1 by a curve 42, and the voltage VOUT by a curve 44.

At a time t1, the converter is switched on. In other words, the ENA signal goes from a low value to a high value, meaning that the converter is switched on. A start-up phase of the converter begins. The various components, in particular the comparators 21, 23 and 27 are switched on. At this time t1, the signal SD_RDY is at a low value, meaning that the converter is not ready to supply a load. In addition, the voltage VREF starts to increase to reach its operating value, i.e. the setpoint value at which we want to make the voltage VOUT equal.

At time t1, node 11 is in a high impedance state. The current through the inductor 15 is zero. The voltage VOUT is zero. In addition, capacitor 33 is discharged and the voltage at node 20 is zero.

At a time t2, later than time t1, the voltage VREF reaches its operating value, and the comparators are ready to compare their input values. The signals TON_OK and TOFF_OK thus take, in the example of FIG. 2, a high value meaning that the ramps have not reached the value VREF1, the ramps not having begun their variations, and the operating cycle has not begun.

At a time t3, later than time t2, the capacitor 33 begins to be charged. The voltage VREF1 increases and becomes greater than the voltage VOUT, the voltages VOUT and VREF1 having been substantially equal to zero between times t1 and t3. The comparator 21 therefore determines that voltage VREF1 is greater than voltage VOUT, and signal TON_GO goes from a low value to a high value, starting an energy accumulation phase. The current in the inductor 15 increases.

The converter is in PFM mode. This allows the voltage VOUT to follow the growth of VREF1 by a succession of cycles comprising an energy accumulation phase and an energy restitution phase, the cycles being separated by a phase during which the node 11 is in a high impedance state.

At a time t4, the voltage VREF1 reaches the set value VREF. The start-up phase is thus over and the signal SD_RDY goes from a low value, meaning that the start-up phase is in progress and that the load cannot be supplied, to a high value, meaning that the converter is able to supply the load. The converter can then remain in a PFM operating mode or enter another operating mode, such as a PWM (Pulse Width Modulation) operating mode. Some devices may be able to operate only in low power mode and not be able to operate in PWM mode.

The converter is therefore started up between the times t1 and t4. From the time t4, the converter is in normal operation. During the start-up, the voltage VREF1 is ramped to reach the value VREF. During normal operation, the voltage VREF1 is substantially constant and substantially equal to the setpoint voltage VREF. The voltage VREF is substantially constant between times t3 and t4, i.e., during the growth of the voltage VREF1.

According to one embodiment, the node 20 is connected to the node 2, for example by a switch. Thus, the capacitor 33 is charged up to the value of the voltage VOUT at the beginning of the start-up phase, for example before time t3.

An advantage of the described embodiments is that the PFM operating mode, which cycles energy accumulation and restitution when the output voltage is less than the voltage VREF1, is less energy intensive than the PWM operating mode, in which energy accumulation and restitution cycles are performed continuously.

Another advantage of the described embodiments is that they allow the manufacture of devices intended to operate only in low power mode, by a PFM operating mode. These devices may not comprise circuitry corresponding to the PWM operating mode, which is typically used for switching power supply type converter start-up.

Another advantage of the described embodiments is that they avoid the presence of negative current in the inductor 15 and thus save power. The start-up phase is thus shorter.

Another advantage of the described embodiments is that neither a clock signal nor an error amplifier is required to start the converter.

Various embodiments and variants have been described. Those skilled in the art will understand that certain features of these embodiments can be combined and other variants will readily occur to those skilled in the art.

Finally, the practical implementation of the described embodiments and variants is within the capabilities of those skilled in the art based on the functional description provided hereinabove.

What is claimed is:

1. A voltage converter, comprising:
  a first transistor;
  a second transistor coupled to the first transistor via a first node;
  an inductive element coupled to the first node; and
  a first circuit configured to:
    receive a first signal, a second signal, a third signal, and a fourth signal, the fourth signal indicating that the voltage converter is capable of supplying a load in response to a reference voltage reaching a setpoint voltage, and
    generate a first control signal to control the first transistor and a second control signal to control the second transistor to operate the voltage converter in a pulse frequency modulation (PFM) type operating mode during a start-up phase of the voltage converter, each operating cycle of the PFM type operating mode comprising an energy accumulation phase, an energy restitution phase, and a waiting phase,
    wherein, during the energy accumulation phase, a value of current passing through the inductive element is increasing, the first transistor is in an ON state, the second transistor is in an OFF state, a duration of the energy accumulation phase is set by the first signal received by the first circuit, and a start of the energy accumulation phase is determined by the second signal received by the first circuit,
    wherein, during the energy restitution phase, a value of current passing through the inductive element is decreasing, the first transistor is in the OFF state, the second transistor is in the ON state, and a duration of the energy restitution phase is set by the third signal received by the first circuit, a state transition of the first signal indicating a transition from the energy accumulation phase to the energy restitution phase, and
    wherein, during the waiting phase, the first node is in a high impedance state, the first transistor and the second transistor are in the OFF state, and a duration of the waiting phase is set by the second signal received by the first circuit, a state transition of the second signal indicating a transition from the waiting phase to the energy accumulation phase, and a state transition of the third signal indicating a transition from the energy restitution phase to the waiting phase.

2. The voltage converter according to claim 1, wherein the voltage converter comprises a second circuit configured to generate the second signal, the second circuit comprising a comparator configured to compare an output voltage of the voltage converter and the reference voltage.

3. The voltage converter according to claim 2, wherein the second circuit is further configured to generate the first signal, the second circuit further comprising a second comparator configured to compare the reference voltage and an increasing voltage ramp, the increasing voltage ramp ramping up from a first voltage to the reference voltage.

4. The voltage converter according to claim 3, wherein the second circuit is further configured to generate the third signal, the second circuit further comprising a third comparator configured to compare the reference voltage and a decreasing voltage ramp, the decreasing voltage ramp ramping down from a second voltage to the reference voltage.

5. The voltage converter according to claim 4, further comprising a third circuit configured to provide the fourth signal, the reference voltage generated from a voltage source supplying the voltage converter.

6. The voltage converter according to claim 5, wherein the third circuit comprises a fourth comparator configured to output the fourth signal, the fourth comparator having a first input coupled to the reference voltage and a second input coupled to the setpoint voltage.

7. The voltage converter according to claim 4, wherein a slope of the increasing voltage ramp equals a slope of the decreasing voltage ramp.

8. The voltage converter according to claim 1, wherein the voltage converter is configured such that the current in the inductive element is always positive during the operation of the voltage converter.

9. A method for controlling a voltage converter comprising a first transistor, a second transistor, and an inductive element coupled to the first transistor and the second transistor via a first node, the method comprising operating the voltage converter in a pulse frequency modulation (PFM) type operating mode during a start-up phase of the voltage converter, the operating, in each cycle of the PFM type operating mode, comprising:
  operating, by a first circuit, the voltage converter in an energy accumulation phase corresponding to a value of current passing through the inductive element increasing, the first transistor being in an ON state, the second transistor being in an OFF state, a duration of the energy accumulation phase being set by a first signal, and a start of the energy accumulation phase being set by a second signal, the first signal and the second signal being signals received by the first circuit, operating, by the first circuit, the voltage converter in an energy restitution phase corresponding to a value of current passing through the inductive element decreasing, the first transistor being in the OFF state, the second transistor being in the ON state, and a duration of the energy restitution phase being set by a third signal received by the first circuit, a state transition of the first signal indicating a transition from the energy accumulation phase to the energy restitution phase, and operating, by the first circuit, the voltage converter in a waiting phase corresponding to the first node being in a high impedance state, the first transistor and the second transistor being in the OFF state, and a duration of the waiting phase being set by the second signal, a state transition of the second signal indicating a transition from the waiting phase to the energy accumulation phase, a state transition of the third signal indicating a transition from the energy restitution phase to the waiting phase, and a fourth signal indicating that the voltage converter is capable of supplying a load in response to a reference voltage reaching a setpoint voltage.

10. The method according to claim 9 further comprising: comparing an output voltage of the voltage converter and the reference voltage and generating the second signal based on the comparing.

11. The method according to claim 10, further comprising: comparing the reference voltage and an increasing voltage ramp, the increasing voltage ramp ramping up from a first voltage to the reference voltage.

12. The method according to claim 11, further comprising: comparing the reference voltage and a decreasing voltage ramp, the decreasing voltage ramp ramping down from a second voltage to the reference voltage.

13. The method according to claim 12, further comprising generating the fourth signal, the reference voltage generated from a voltage source supplying the voltage converter.

14. The method according to claim 10, further comprising always maintaining, by the voltage converter, a positive current in the inductive element during the operation of the voltage converter.

15. The voltage converter of claim 1, wherein the duration of the energy accumulation phase and the duration of the energy restitution phase are constant from one cycle to a next cycle.

16. The voltage converter of claim 4, wherein the second circuit further includes a third circuit configured to generate the increasing voltage ramp and the decreasing voltage ramp.

17. The method according to claim 12, wherein a slope of the increasing voltage ramp equals a slope of the decreasing voltage ramp.

18. A system comprising a voltage converter, the voltage converter comprising:
a first transistor;
a second transistor coupled to the first transistor via a first node;
an inductive element coupled to the first node;
a first circuit configured to:
receive a first signal, a second signal, and a third signal, and
generate a first control signal to control the first transistor and a second control signal to control the second transistor to operate the voltage converter in a pulse frequency modulation (PFM) type operating mode during a start-up phase of the voltage converter, each operating cycle of the PFM type operating mode comprising an energy accumulation phase, an energy restitution phase, and a waiting phase; and a second circuit comprising a first comparator and a second comparator, the second circuit configured to:
generate the first signal and the second signal, the first comparator configured to compare an output voltage of the voltage converter and a reference voltage, a state transition of the second signal indicating a transition from the waiting phase to the energy accumulation phase, the second comparator configured to compare the reference voltage and an increasing voltage ramp, the increasing voltage ramp ramping up from a first voltage to the reference voltage, a state transition of the first signal indicating a transition from the energy accumulation phase to the energy restitution phase, wherein, during the energy accumulation phase, a value of current passing through the inductive element is increasing, the first transistor is in an ON state, the second transistor is in an OFF state, a duration of the energy accumulation phase is set by the first signal received by the first circuit, and a start of the energy accumulation phase is determined by the second signal received by the first circuit, wherein, during the energy restitution phase, a value of current passing through the inductive element is decreasing, the first transistor is in the OFF state, the second transistor is in the ON state, and a duration of the energy restitution phase is set by the third signal received by the first circuit, and wherein, during the waiting phase, the first node is in a high impedance state, the first transistor and the second transistor are in the OFF state, and a duration of the waiting phase is set by the second signal received by the first circuit.

19. The system of claim 18, wherein the second circuit is further configured to generate the third signal, the second circuit further comprising a third comparator configured to compare the reference voltage and a decreasing voltage ramp, the decreasing voltage ramp ramping down from a second voltage to the reference voltage, wherein a state transition of the third signal indicates a transition from the energy restitution phase to the waiting phase.

20. The system of claim 19, the voltage converter further comprising a third circuit configured to provide a fourth signal indicating that the voltage converter is capable of supplying a load in response to the reference voltage reaching a setpoint voltage, the reference voltage generated from a voltage source supplying the voltage converter.

21. The system of claim 20, wherein the third circuit comprises a fourth comparator configured to output the fourth signal, the fourth comparator having a first input coupled to the reference voltage and a second input coupled to the setpoint voltage.

22. The system of claim 19, wherein a slope of the increasing voltage ramp equals a slope of the decreasing voltage ramp.

23. The system of claim 19, further comprising a third circuit configured to generate a fourth signal indicating that the voltage converter is capable of supplying a load in response to the reference voltage reaching a setpoint voltage, wherein a state transition of the third signal indicates a transition from the energy restitution phase to the waiting phase.

\* \* \* \* \*